(12) United States Patent
Gunn et al.

(10) Patent No.: US 11,216,447 B2
(45) Date of Patent: *Jan. 4, 2022

(54) CONTROL SYSTEMS WITH INDEPENDENT DATA PROCESSING

(71) Applicant: Capital One Services, LLC, McLean, VA (US)

(72) Inventors: Daniel Gunn, Toronto (CA); Zhihao Gao, Markham (CA); Pulkit Gulati, Brampton (CA); William Cartar, Toronto (CA)

(73) Assignee: Capital One Services, LLC, McLean, VA (US)

( * ) Notice: Subject to any disclaimer, the term of this patent is extended or adjusted under 35 U.S.C. 154(b) by 39 days.

This patent is subject to a terminal disclaimer.

(21) Appl. No.: 16/781,435

(22) Filed: Feb. 4, 2020

(65) Prior Publication Data
US 2021/0026833 A1 Jan. 28, 2021

Related U.S. Application Data

(63) Continuation of application No. 16/523,270, filed on Jul. 26, 2019, now Pat. No. 10,599,635.

(51) Int. Cl.
*G06F 16/23* (2019.01)
*G06F 16/25* (2019.01)
(Continued)

(52) U.S. Cl.
CPC ........ *G06F 16/2365* (2019.01); *G06F 16/213* (2019.01); *G06F 16/2282* (2019.01); *G06F 16/258* (2019.01); *G06N 20/00* (2019.01)

(58) Field of Classification Search
None
See application file for complete search history.

(56) References Cited

U.S. PATENT DOCUMENTS

2002/0169789 A1 11/2002 Kutay et al.
2002/0188610 A1 12/2002 Spencer
(Continued)

OTHER PUBLICATIONS

IBM Knowledge Center—Splitting Program Logic, https://www.ibm.com/support/knowledgecenter/en/SSAL2T_9.1.0/com.ibm.cics.tx.doc/concepts/c_spltng_prgrm_logic.html, Mar. 20, 2019.
(Continued)

*Primary Examiner* — Son T Hoang
(74) *Attorney, Agent, or Firm* — Banner & Witcoff, Ltd.

(57) ABSTRACT

Aspects described herein generally improve the quality, efficiency, and speed of data processing systems by generating staging data independently from the execution of control scripts which process the staging data. The staging data can be independently loaded, validated, and utilized across multiple control scripts, reducing redundancy in the loading of data and the overhead of executing separate data processing for each control script. The control scripts can be automatically validated, such as by verifying expected output data ranges. Additionally, the complexity of the control scripts can be reduced as the loading of data is not performed by the control scripts. The controls scripts can generate a variety of output data, such as an indication of impacted accounts, and provide notifications based on the output data. A variety of machine learning classifiers can be used to automatically generate the staging data and validate the staging data and/or output data.

20 Claims, 7 Drawing Sheets

(51) Int. Cl.
    *G06N 20/00*     (2019.01)
    *G06F 16/22*     (2019.01)
    *G06F 16/21*     (2019.01)

(56) References Cited

U.S. PATENT DOCUMENTS

| | | |
|---|---|---|
| 2003/0037263 A1 | 2/2003 | Kamat et al. |
| 2005/0080766 A1 | 4/2005 | Ghatare |
| 2005/0216497 A1 | 9/2005 | Kruse et al. |
| 2006/0155720 A1 | 7/2006 | Feinberg |
| 2007/0073657 A1 | 3/2007 | Santosuosso |
| 2009/0077014 A1 | 3/2009 | Zachariah |
| 2009/0077114 A1 | 3/2009 | Zachariah |
| 2012/0233148 A1 | 9/2012 | Chen et al. |
| 2012/0265726 A1* | 10/2012 | Padmanabhan ....... G06F 16/214 707/602 |
| 2013/0325788 A1* | 12/2013 | Brown ................. G06F 16/254 707/602 |
| 2017/0011087 A1* | 1/2017 | Hyde ................... G06F 16/254 |
| 2017/0148000 A1* | 5/2017 | Hopen ................. G06Q 20/105 |
| 2017/0206208 A1* | 7/2017 | Zhang ................... G06F 16/25 |
| 2018/0129684 A1* | 5/2018 | Wilson ................. G06F 16/273 |

OTHER PUBLICATIONS

Django at a glance, https://docs.djangoproject.com/en/2.1/intro/overview/, Mar. 20, 2019.

* cited by examiner

CONTROL SYSTEMS WITH INDEPENDENT DATA PROCESSING

CROSS-REFERENCE TO RELATED APPLICATIONS

The instant application claims priority to U.S. patent application Ser. No. 16/523,270, titled "Control Systems with Independent Data Processing" and filed Jul. 26, 2019, the disclosure of which is hereby incorporated by reference in its entirety.

FIELD OF USE

Aspects of the disclosure relate generally to data processing and more specifically to the automatic execution of centralized data processing and control processing.

BACKGROUND

A database management system can allow for the storage and retrieval of a variety of data. A database can be used to organize data into one or more tables having a set of columns and rows of data. Each table in a database typically represents a particular entity or concept, the columns represent values attributed to the entity or concept, and the rows represent instances of that type of entity having particular values.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein generally improve the quality, efficiency, and speed of data processing systems, offering improved performance and reduced computational overhead, by generating staging data independently from the execution of control scripts which process the staging data. The staging data can be independently loaded, validated, and utilized across multiple control scripts, reducing redundancy in the loading of data and reducing the overhead of executing separate data processing for each control script. The control scripts can be automatically validated such as by ensuring sufficient unit test coverage and by verifying expected output data ranges. Additionally, the complexity of the control scripts can be reduced as the loading of data is not performed by the control scripts. The controls scripts can generate a variety of output data, such as an indication of impacted accounts, and provide notifications based on the output data. A variety of machine learning classifiers can be used to automatically generate the staging data and/or validate the staging data and/or output data.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
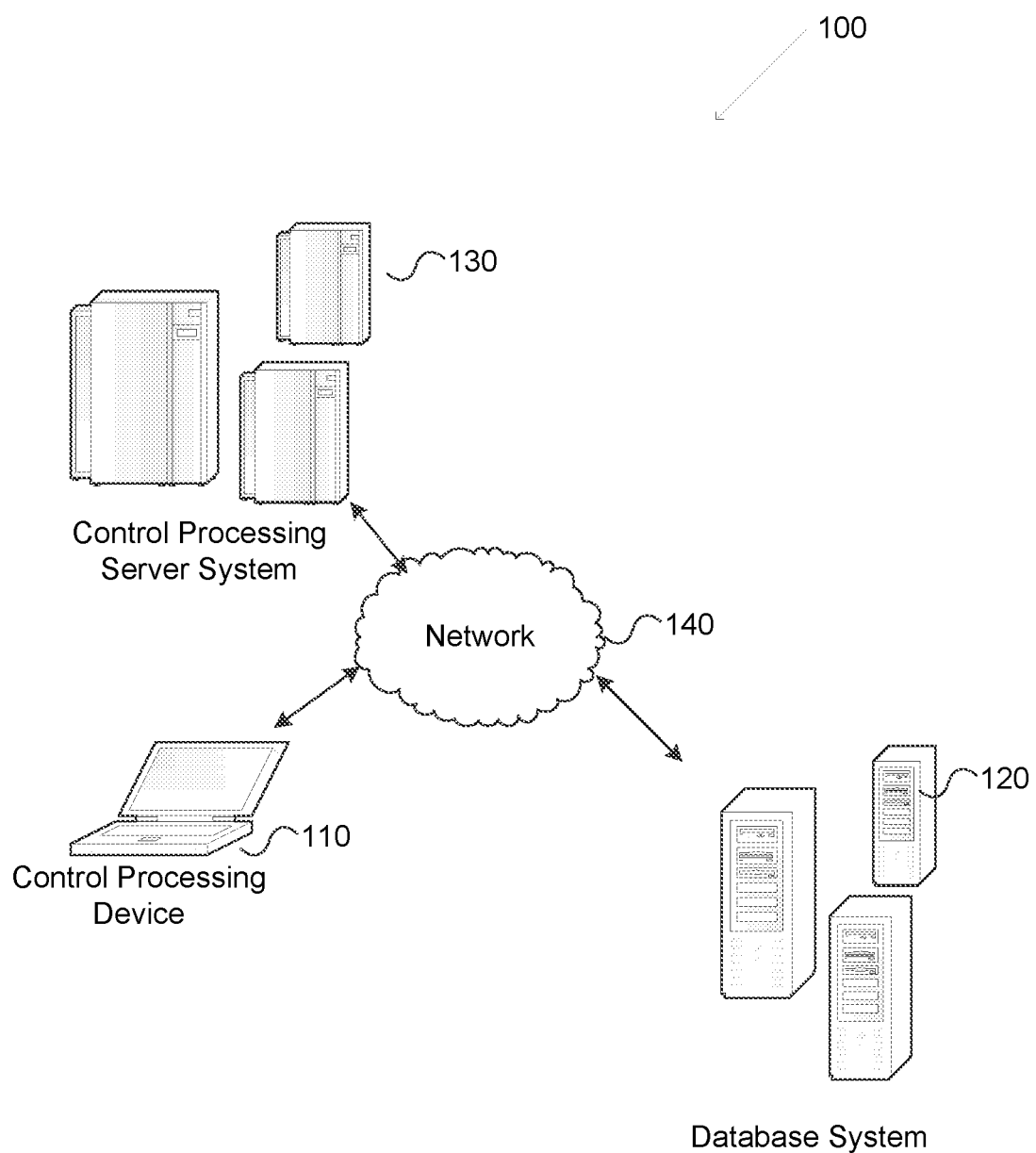
FIG. 1 illustrates an example of a control processing system in which one or more aspects described herein can be implemented.

In the following description of the various embodiments, reference is made to the accompanying drawings, which form a part hereof, and in which is shown by way of illustration various embodiments in which aspects of the disclosure can be practiced. It is to be understood that other embodiments can be utilized and structural and functional modifications can be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein can relate to methods and techniques for control systems with independent data processing. Prior art control systems typically include a data analyst who writes a script that loads data and checks the data against a set of validation conditions. The prior art scripts include both the loading of data and the execution of the control logic on the loaded data. These scripts tend to be large and complex due to the combination of data processing and control logic in a single script. If the data does not properly load, execute with the control logic, or validate, a manual review of the data can be initiated. Additionally, each business unit within a business typically specifies and develops their own scripts, so there is little or no overlap of data processing or controls as development is custom for each business unit.

Control processing systems in accordance with aspects described herein include a variety of frameworks to load data and execute control logic to ensure improved reliability, maintainability, and performance relative to prior art systems. Control processing systems can separate data processing, such as the staging of data and/or generation of staging tables, from the execution of control logic and any data validation. Separating the data processing from the control logic can simplify testing and development. Control processing systems can employ a standardized structured for data processing and/or control logic such that a data definition of the desired data and the definition of the control can be provided. The appropriate data can then be automatically obtained and compared against expected control logic definitions so that the loaded data is validated before the control logic is executed. Control processing systems can obtain data load scripts from a variety of sources, identify the data to be loaded, and automatically generate query data that generates one or more staging tables storing the necessary data for multiple control scripts. By separating the loading of data from the execution of control logic, control processing systems can typically execute the desired data and control processing exponentially faster than the prior art systems. In many embodiments, control scripts can be written in a human-readable form, such as in a human-readable configuration file, and automatically converted into machine-executable scripts. Supplemental data, such as documentation, can also be automatically generated when the executable scripts and/or query data is generated. A variety of embodiments provide versioning of control scripts and/or data load scripts so that historical controls and data accesses can be tracked.

Control Processing Systems and Computing Devices

FIG. 1 illustrates a control processing system 100 in accordance with an embodiment of the invention. The control processing system 100 includes at least one control processing device 110, at least one database system 120, and/or at least one control processing server system 130 in communication via a network 140. It will be appreciated that the network connections shown are illustrative and any means of establishing a communications link between the computers can be used. The existence of any of various network protocols such as TCP/IP, Ethernet, FTP, HTTP and the like, and of various wireless communication technologies such as GSM, CDMA, WiFi, and LTE, is presumed, and the various computing devices described herein can be configured to communicate using any of these network protocols or technologies. Any of the devices and systems described herein can be implemented, in whole or in part, using one or more computing systems described with respect to FIG. 2.

Control processing devices 110 can allow users to create a variety of staging table scripts and/or control scripts and obtain notifications regarding the output of the control scripts as described herein. Database systems 120 can provide a database for storing data and staging tables and/or creating staging tables based on one or more database command scripts. Databases can include, but are not limited to relational databases, hierarchical databases, distributed databases, in-memory databases, flat file databases, XML databases, NoSQL databases, graph databases, and/or a combination thereof. Control processing server systems 130 can obtain data load scripts and control scripts, validate the obtained scripts, automatically generate database command scripts, execute control scripts to generate output data, and/or generate notifications based on the output data. Additionally, control processing server systems 130 can train and/or provide machine classifiers to perform any of the processes described herein. The network 140 can include a local area network (LAN), a wide area network (WAN), a wireless telecommunications network, and/or any other communication network or combination thereof.

The data transferred to and from various computing devices in a control processing system 100 can include secure and sensitive data, such as confidential documents, customer personally identifiable information, and account data. Therefore, it can be desirable to protect transmissions of such data using secure network protocols and encryption, and/or to protect the integrity of the data when stored on the various computing devices. For example, a file-based integration scheme or a service-based integration scheme can be utilized for transmitting data between the various computing devices. Data can be transmitted using various network communication protocols. Secure data transmission protocols and/or encryption can be used in file transfers to protect the integrity of the data, for example, File Transfer Protocol (FTP), Secure File Transfer Protocol (SFTP), and/or Pretty Good Privacy (PGP) encryption. In many embodiments, one or more web services can be implemented within the various computing devices. Web services can be accessed by authorized external devices and users to support input, extraction, and manipulation of data between the various computing devices in the control processing system 100. Web services built to support a personalized display system can be cross-domain and/or cross-platform, and can be built for enterprise use. Data can be transmitted using the Secure Sockets Layer (SSL) or Transport Layer Security (TLS) protocol to provide secure connections between the computing devices. Web services can be implemented using the WS-Security standard, providing for secure SOAP messages using XML encryption. Specialized hardware can be used to provide secure web services. For example, secure network appliances can include built-in features such as hardware-accelerated SSL and HTTPS, WS-Security, and/or firewalls. Such specialized hardware can be installed and configured in the control processing system 100 in front of one or more computing devices such that any external devices can communicate directly with the specialized hardware.

Figure 2:
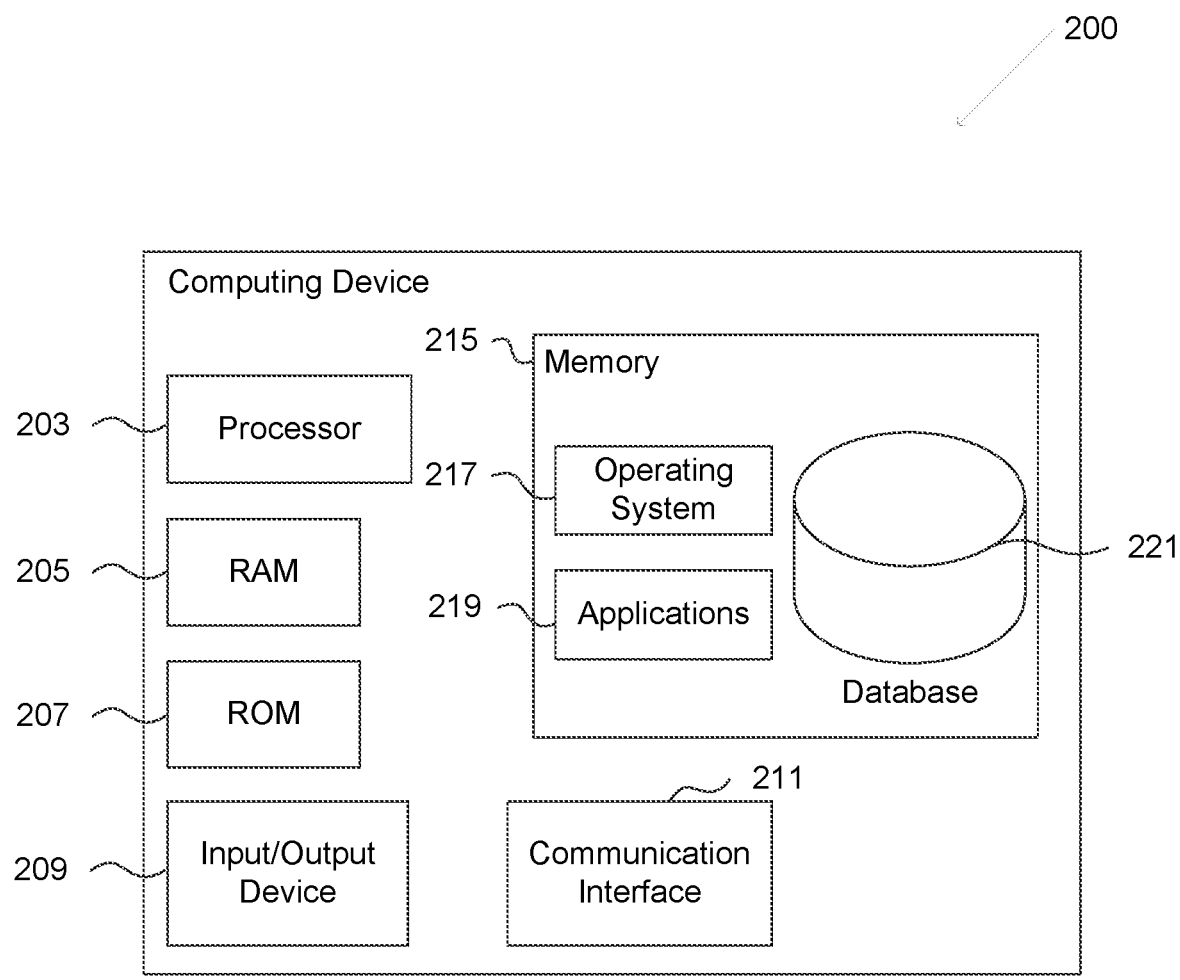
FIG. 2 illustrates an example computing device in accordance with one or more aspects described herein.

Turning now to FIG. 2, a computing device 200 in accordance with an embodiment of the invention is shown. The computing device 200 can include a processor 203 for controlling overall operation of the computing device 200 and its associated components, including RAM 205, ROM 207, input/output device 209, communication interface 211, and/or memory 215. A data bus can interconnect processor(s) 203, RAM 205, ROM 207, memory 215, I/O device 209, and/or communication interface 211. In some embodiments, computing device 200 can represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 can include a microphone, keypad, touch screen, and/or stylus through which a user of the computing device 200 can provide input, and can also include one or more of a speaker for providing audio output and a video display device for providing textual, audiovisual, and/or graphical output. Software can be stored within memory 215 to provide instructions to processor 203 allowing computing device 200 to perform various actions. For example, memory 215 can store software used by the computing device 200, such as an operating system 217, application programs 219, and/or an associated internal database 221. The various hardware memory units in memory 215 can include volatile and nonvolatile, removable and non-removable media implemented in any method or technology for storage of information such as computer-readable instructions, data structures, program modules, or other data. Memory 215 can include one or more physical persistent memory devices and/or one or more non-persistent memory devices. Memory 215 can include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that can be used to store the desired information and that can be accessed by processor 203.

Communication interface 211 can include one or more transceivers, digital signal processors, and/or additional circuitry and software for communicating via any network, wired or wireless, using any protocol as described herein.

Processor 203 can include a single central processing unit (CPU), which can be a single-core or multi-core processor, or can include multiple CPUs. Processor(s) 203 and associated components can allow the computing device 200 to execute a series of computer-readable instructions to perform some or all of the processes described herein. Although not shown in FIG. 2, various elements within memory 215 or other components in computing device 200, can include one or more caches, for example, CPU caches used by the processor 203, page caches used by the operating system 217, disk caches of a hard drive, and/or database caches used to cache content from database 221. For embodiments including a CPU cache, the CPU cache can be used by one or more processors 203 to reduce memory latency and access time. A processor 203 can retrieve data from or write data to the CPU cache rather than reading/writing to memory 215, which can improve the speed of these operations. In some examples, a database cache can be created in which certain data from a database 221 is cached in a separate smaller database in a memory separate from the database, such as in RAM 205 or on a separate computing device. For instance, in a multi-tiered application, a database cache on an application server can reduce data retrieval and data manipulation time by not needing to communicate over a network with a back-end database server. These types of caches and others can be included in various embodiments, and can provide potential advantages in certain implementations of devices, systems, and methods described herein, such as faster response times and less dependence on network conditions when transmitting and receiving data.

Although various components of computing device 200 are described separately, functionality of the various components can be combined and/or performed by a single component and/or multiple computing devices in communication without departing from the invention.

Generating Output Data and Notifications

Figure 3:
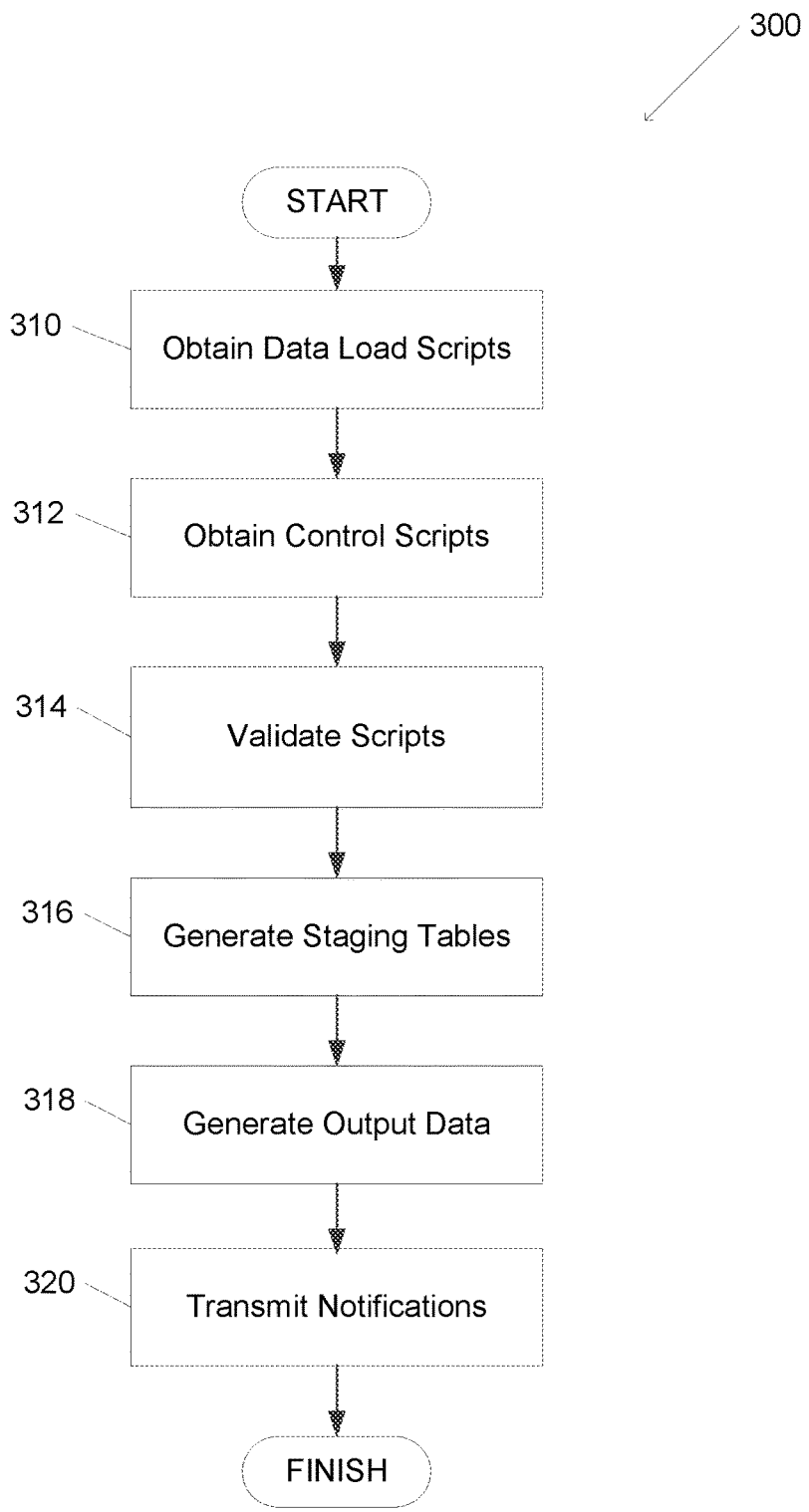
FIG. 3 depicts a flow chart for generating output data according to one or more aspects of the disclosure.

A variety of control scripts can be executed to process staging data, such as data stored in staging tables, to generate a set of output data. Notifications can be generated based on the output data and transmitted to appropriate recipients for further processing and/or analysis. FIG. 3 depicts a flow chart for generating output data according to one or more aspects of the disclosure. Some or all of the steps of process 300 can be performed using one or more computing devices as described herein.

Process 300 can include obtaining (310) data load scripts. In a variety of embodiments, a data load script includes one or more instructions that cause a database system to generate one or more staging tables including a subset of the raw data stored using the database system. The data load script can include a set of attributes, a set of values, a set of transformations to be applied to the retrieved data, and/or a set of filters to be applied to the attributes, values, and/or the transformed data. The data can be obtained from one or more tables within the database. For example, a data load script can obtain all records from a database filtered by an activity date between the first and last date of the month and an account balance below a threshold value. A data load script can include instructions that can be executed directly by a database system, such as a set of structured query language (SQL) commands, and/or human-readable configuration files, such as YAML Ain't Markup Language (YAML) files. In many embodiments, human-readable configuration files can be automatically transformed into a set of instructions that can be executed directly by the database system. The human-readable configuration files can indicate one or more sources of raw data, a set of data to be obtained and/or processed. The set of data can include a set of dimensions classifying the data to be obtained and/or processed. The generated data load script can include the necessary database commands to identify, join, and format raw data to create a staging table ready for consumption by a control script. In many embodiments, one or more machine classifiers can be used to automatically classify available data sources based on historical data to identify raw data which can be included in a data load script and calculate a probabilistic likelihood that the identified raw data should be included in the data load script. Any of a variety of machine classifiers, such as linear classifiers, naive Bayes classifiers, support vector machines, decision trees, boosted trees, random forests, neural networks, hidden Markov models, and/or combinations of machine classifiers can be utilized. In several embodiments, machine classifiers can be trained using a set of training data including historical raw data and/or previously provided data load scripts and/or control scripts.

Control scripts can be obtained (312). A control script can include a set of instructions that performs one or more tasks on the data stored in the staging table(s). In a variety of embodiments, a control script can verify that one or more business processes are being properly performed. For example, a business process can include charging a fee to customers who go over a credit limit on a credit card and the corresponding controls script can identify (1) all accounts where an over limit fee was charged and (2) all accounts that exceeded the credit limit for the account in a particular time frame, such as one month. The control script can also identify any accounts where an over limit fee was charged but the account did not exceed its credit limit and those accounts which went over the credit limit but were not charged the over limit fee. The control script can include an executable computer program, a script written in an interpreted language, such as Python, and/or a set of human-readable instructions. Human-readable instructions can include YAML scripts. In many embodiments, human-readable configuration files can be automatically transformed into a set of instructions that can be executed by a control processing device. Any of a variety of tools, such as PyYAML, can be used to generate control scripts based on human-readable instructions. In many embodiments, one or more machine classifiers can be used to automatically classify control scripts based on historical data to identify particular tasks to be performed by a control script and calculate a probabilistic likelihood that the particular task is appropriate for the control script. For example, control scripts that process account data to identify accounts that have a balance below a threshold value can also perform a fraud detection task to identify any large transactions that have occurred over a particular period of time with a 75% likelihood that fraud detection is a desired action for the control script. Any of a variety of machine classifiers and/or combinations of machine classifiers can be utilized to classify control scripts. In several embodiments, machine classifiers can be trained using a set of training data including historical control scripts and/or the expected output of those control scripts. In a number of embodiments, the use of machine classifiers improves the detection of trends within a set of data during the execution of the control scripts. A machine classifier trained using historical control scripts can identify trends in the underlying data that may not be explicitly indicated in the obtained control script. In a variety of embodiments, a machine classifier can modify a control script to include additional logic to query a staging table to identify data stored in the staging table which corresponds to the identified trend(s).

Scripts can be validated (314). The data load scripts and/or control scripts can be validated to ensure that no syntax errors and/or logical errors are present in the scripts. In this way, the scripts can be validated to ensure that both human-readable configuration files can be converted into executable data load scripts and/or control scripts and that the executable scripts can be executed without causing the executing system to fail, such as by having a program crash and/or enter an infinite loop. Scripts can also be validated to ensure that appropriate data is being obtained and/or processed and that the obtained data and/or processed data falls within expected value ranges. For example, a data load script can be validated to check that the data load script does not request data that is not present in a database. The value ranges can be determined automatically, such as by the type of data being processed, and/or manually defined in the data load script and/or control script. In many embodiments, documentation describing the operation of the scripts can be automatically generated during the validation of the scripts. A variety of processes for validating scripts and/or human-readable configuration files are described in more detail with respect to FIG. 4.

Staging tables can be generated (316). In several embodiments, staging tables can be generated by executing one or more data load scripts to fetch a set of raw data from one or more database tables, perform a set of transformations and/or filters, on the fetched data to generate a set of values, and generate a staging table including a set of dimensions and the set of values. The dimensions of the staging table can include one or more dimensions from one or more tables stored in the database, dimensions derived from one or more dimensions defined in the database, and/or dimensions defined in the data load script. The attributes can include a subset of the raw data and/or a set of values extracted from the raw data stored in the databases, transformed according to the requirements specified in the data load script, and loaded into the staging table(s). Any of a variety of transformations, such as selecting particular dimensions to load, translating the raw data from one format to another, encoding the raw data, deriving new data calculated based on the raw values, sorting the raw data, joining data from multiple sources of raw data, aggregating the raw data, transposing and/or pivoting the raw data, deduplicating the raw data, validating the data, and the like can be defined in the data load script and performed to generate the staging tables. The staging tables can also include a set of relationships between the dimensions, values, and or different staging tables. In many embodiments, multiple data load scripts can be combined to generate a single staging table with the data specified in each of the data load scripts. In several embodiments, a single data load script can be used to generate multiple staging tables. A variety of processes for generating staging tables are described in more detail with respect to FIG. 7. However, it should be noted that staging data stored in any format, including database table(s), flat files, a set of comma-separated values, and/or any other representation, can be utilized as appropriate to the specific requirements of embodiments of the invention.

Output data can be generated (318). In a variety of embodiments, the output data includes some or all of the dimensions and/or values from the staging table that correspond to the tasks defined in the control script. For example, the output data for a control script can include a set of account numbers identifying accounts that went over a credit limit but were not charged an over limit fee and accounts that did not go over a credit limit but were charged an over limit fee. The output data could also include the credit limit for the affected accounts, the amount of fee charged, the name of the customer associated with the account, the date on which the credit limit was exceeded, the date on which the over limit fee was charged, and/or any other information as specified in the control script. In several embodiments, the output data can be stored using a control processing server system.

Notifications can be transmitted (320). Notifications can indicate one or more staging tables, control scripts, and/or output data, associated anomalies, and/or suggested actions to be taken based on the data, scripts, and/or anomalies. Notifications can be automatically generated based on anomalies in the staging tables and/or output data. Anomalies in the staging tables can include generated dimensions and/or values that do not fall within expected ranges, errors related to the validation of the data load script, and/or errors that occurred during the execution of the data load script. Anomalies in the output data can include the output data generated based on the control script, invalid data identified in the output data, errors during the validation of the control script, and/or errors that occurred during the execution of the control script. In a number of embodiments, one or more machine classifiers can be used to automatically identify anomalies and/or any other invalid data in the staging tables, controls scripts, and/or output data, corrective action to be taken based on the identified anomalies, and/or calculate a probabilistic likelihood that the corrective action to be taken corresponds to the identified anomalies. In several embodiments, machine classifiers can be trained using a set of training data including historical notification data, expected output data, and/or the actions taken based on the historical notification data. The notifications can be transmitted to any computing device, such as a control processing device, which can take an action in response to the notification. For example, a validation-related error can cause a control processing device to automatically correct one or more aspects of the script that cause the script to fail validation. In several embodiments, notifications that identify impacted accounts can be sent to a computing device that can automatically correct the impacted accounts. For example, accounts that were charged an over limit fee but did not go over the account credit limit during a time period can have the over limit fee refunded to the account, while accounts that were not charged an over limit fee but did go over the account credit limit during the time period can have the over limit fee applied to the account. In a number of embodiments, one or more machine classifiers can be used to automatically identify anomalies in the staging tables, controls scripts, and/or output data and/or corrective action to be taken based on the identified anomalies. In several embodiments, machine classifiers can be trained using a set of training data including historical notification data, expected output data, and/or the actions taken based on the historical notification data. In many embodiments, the corrective actions can be provided to a human operator for manual correction via a control processing device.

Validating Scripts

Figure 4:
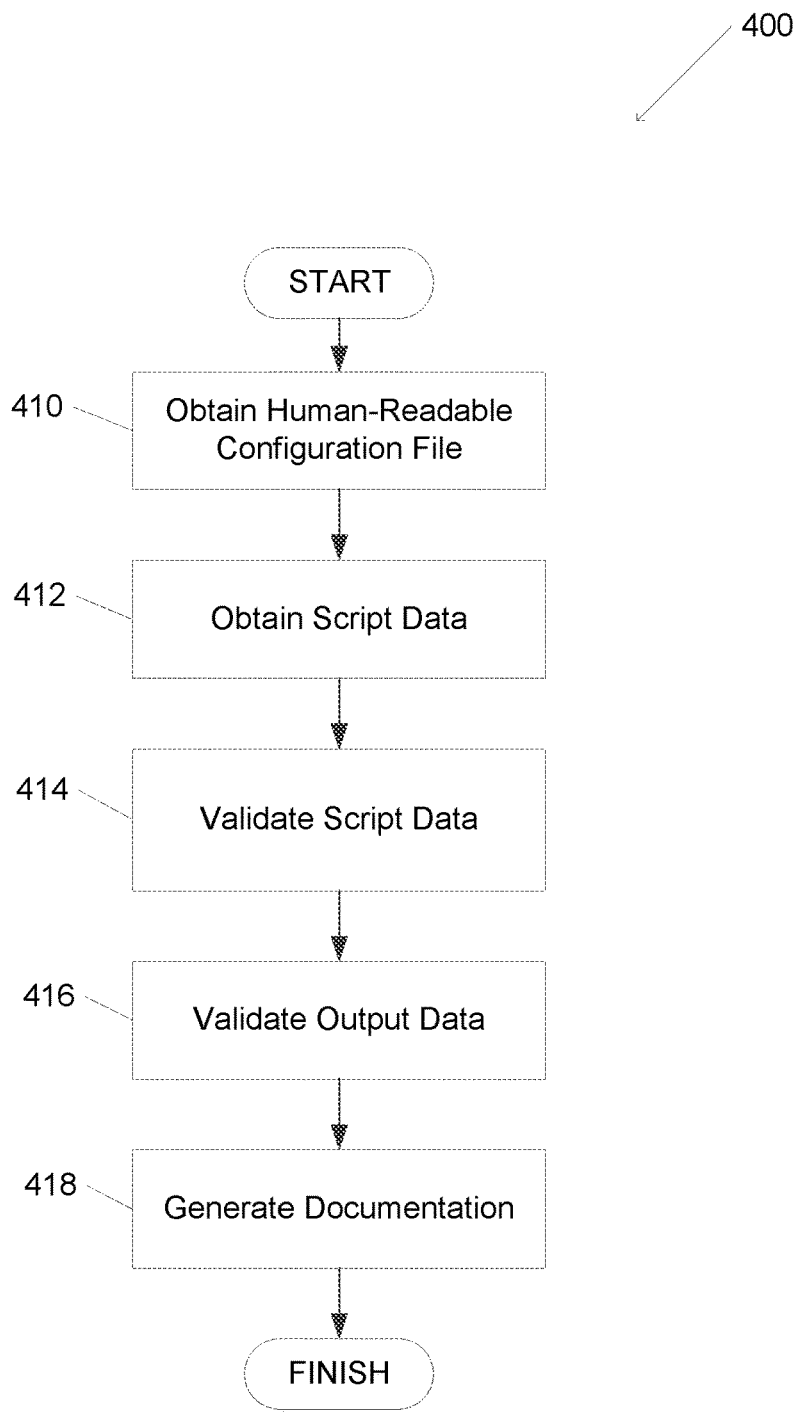
FIG. 4 depicts a flow chart for validating scripts according to one or more aspects of the disclosure.

Script data can be automatically generated and/or validated to ensure that the script data will properly execute and that the necessary data is created and/or processed. FIG. 4 depicts a flow chart for validating scripts according to one or more aspects of the disclosure. Some or all of the steps of process 400 can be performed using one or more computing devices as described herein.

Process 400 can include obtaining (410) one or more human-readable configuration files. Human-readable configuration files can be formatted using any of a variety of languages such as, but not limited to, YAML, JSON, OGDL, and XML. In several embodiments, human-readable configuration files indicate a set of data requirements that can be used to generate a data load script and/or a set of tasks that can be used to generate a control script. Human-readable configuration files can indicate one or more sources of raw data, a set of data to be obtained, a set of transformations and/or aggregations to be applied to the obtained data, and/or a set of filters to be applied to the data. For example, a human-readable configuration file can indicate a request for all account numbers having a balance below a threshold value within a specified date range. In many embodiments, the sources of raw data utilized to obtain the data indicated in a human-readable configuration file are automatically determined when script data is generated based on the human-readable configuration file as described in more detail herein. In this way, human-readable configuration files can specify data needed to perform one or more tasks without requiring underlying knowledge of the database schemas maintained by a database system or any other computing device. In a variety of embodiments, human-readable configuration files can indicate one or more tasks to be performed and a set of data on which the tasks are to be performed. Tasks can indicate any of a variety of logical operations to be performed on the set of data. The set of data can indicate one or more staging tables, dimensions, and/or values to be used in performing the specified tasks. For example, a task can indicate a set of logical operations to compare the account balance to the credit limit for the account over a specific time period and generate a set of output data indicating account numbers for those accounts where the account balance exceeded the credit limit and the corresponding set of data can indicate the necessary data is an account number, an account balance, the credit limit for the account, and the date range for the task. The set of data can be obtained from one or more staging tables as described herein. In a variety of embodiments, human-readable configuration files can specify both the desired data, the transformations to the data, and the tasks to be performed on the data. In this way, a single human-readable configuration file can be used to generate both data load scripts and control scripts as described herein. In several embodiments, tasks can be implemented using one or more functions defined in one or more control scripts.

Script data can be obtained (412). Script data can include a set of instructions that can be performed by a computing device. For example, script data can include one or more SQL queries that can be processed by a database system to obtain data stored in one or more database tables and/or generate a staging table based on the obtained data. In another example, script data can include a set of instructions that cause a control processing server system to obtain data from one or more staging tables, perform one or more tasks using data stored in one or more staging tables to generate output data, and/or generate one or more notifications based on the output data and/or the performance of the script data. In many embodiments, the script data is obtained from a control processing device. In a variety of embodiments, the script data is automatically generated based on one or more human-readable configuration files by mapping elements in the human-readable configuration file to specific structures in a machine-executable script. In several embodiments, the script data is automatically generated by processing one or more human-readable configuration files to obtain one or more machine-executable scripts. In many embodiments, a code emitter can be used to generate machine-executable scripts from the human-readable configuration files. For example, the PyYAML tool can be used to generate scripts in the Python programming language from human-readable configuration files formatted using YAML. However, any tools can be used to convert from human-readable configuration files to machine-executable scripts, including those that generate machine-executable scripts that can be executed directly by a computing device and/or using an interpreter to perform a just-in-time compilation and/or translation of an intermediate code, such as bytecode, to a natively executable script. In many embodiments, template data can be used to generate the human-readable configuration files to machine-executable scripts. For example, a template can provide a mapping of an element in a human-readable configuration file to a structure in a machine-executable script. The generation of the machine-executable script can include modifying the structure specified in the template with specific values for the corresponding element(s) in the human-readable configuration file and modifying the machine-executable script to include the modified structure.

Script data can be validated (414). In several embodiments, the script data can be validated to ensure that there are no errors, in syntax and/or in style, in the script data. For example, the script data can be validated to ensure that all variables are declared and/or initialized, declared interfaces are implemented, correct modules are imported, variable names conform to defined standards, that no code is duplicated, no infinite loops and/or recursions exist in the script data, that exceptions are properly handled, and the like. In a number of embodiments, a variety of tools can be used to validate the script data. For example, the Pylint tool can be used to validate script data formatted in the Python language. The script data can also be validated to ensure that all portions of the script data can be executed and/or the data requested and/or generated by the script is valid. In a variety of embodiments, one or more unit tests can be performed on the script data to test each function in the script data. In many embodiments, a unit test executes one or more functions of a script to determine that the function does not fail and outputs expected values based on a variety of different input parameters. For example, one or more unit tests can be run against a control script to ensure that the control script generates the correct output data based on particular sets of input data generated based on expected values obtained from a staging table. In a variety of embodiments, the unit tests can test that a data load script queries for databases, tables, and/or dimensions that are stored using a database system and/or that the values, transformations, and/or aggregations performed on raw data obtained from the database are valid and/or fall within expected ranges. For example, a unit test can test a data load script to ensure that each dimension present in a SQL query exists in the schema defining the table and/or database being queried. In a second example, a unit test can test a data load script to ensure that the type of value, such as a character, bit string, integer, and the like, being returned by a query corresponds to the expected type of value. In a third example, a unit test can test a data load script to ensure that a defined aggregation can be performed on the specific values being returned by the database system based on the query. In a variety of embodiments, the unit tests can be automatically generated based on human-readable configuration files used to generate (412) the script data.

Output data can be validated (416). The output data generated by a data load script (e.g. a staging table) and/or a control script can be validated to ensure that both the appropriate type of data is output and that the values of the output data correspond to valid data. The output data, such as staging tables and output data generated by control scripts, can be validated each time the staging table is refreshed and/or the control scripts are executed. In many embodiments, unit tests can be developed to validate the output data. In several embodiments, unit tests can be developed using one or more machine classifiers. A machine classifier can automatically generate expected output data based on the script data along with a probabilistic likelihood that the expected output data corresponds to real-world data, such as raw data stored by a database system. The machine classifier can be trained using any of a variety of data, such as the dimensions defined in a staging table schema, data types required for a control script, historical input data and/or output data identified as a test case, and/or synthetic data sets having pre-defined valid input and output values. A variety of processes for testing staging data and data load scripts are described in more detail with respect to FIG. 5. A variety of processes for testing control scripts and output data are described in more detail with respect to FIG. 6.

Documentation can be generated (418). Documentation can be generated based on the script data. The documentation can describe what data is being obtained and/or processed, the expected input values, the expected output values, intended targets for generated notifications, and the like. The documentation can be automatically generated based on the human-readable configuration files and/or script data. In many embodiments, a documentation tool can be used to process the human-readable configuration files and/or script data. For example, the Sphinx tool can be used to generate documentation for script data written in the Python language. In many embodiments, template data can be used to generate the documentation from the human-readable configuration files and/or script data. For example, a template can provide a mapping of an element in a human-readable configuration file and/or script data to particular element in the generated documentation. The generation of the documentation can include modifying the structure specified in the template with specific values for the corresponding element(s) in the human-readable configuration file and/or script data and including the modified structure in the generated documentation.

Automatically Testing Staging Data

Figure 5:
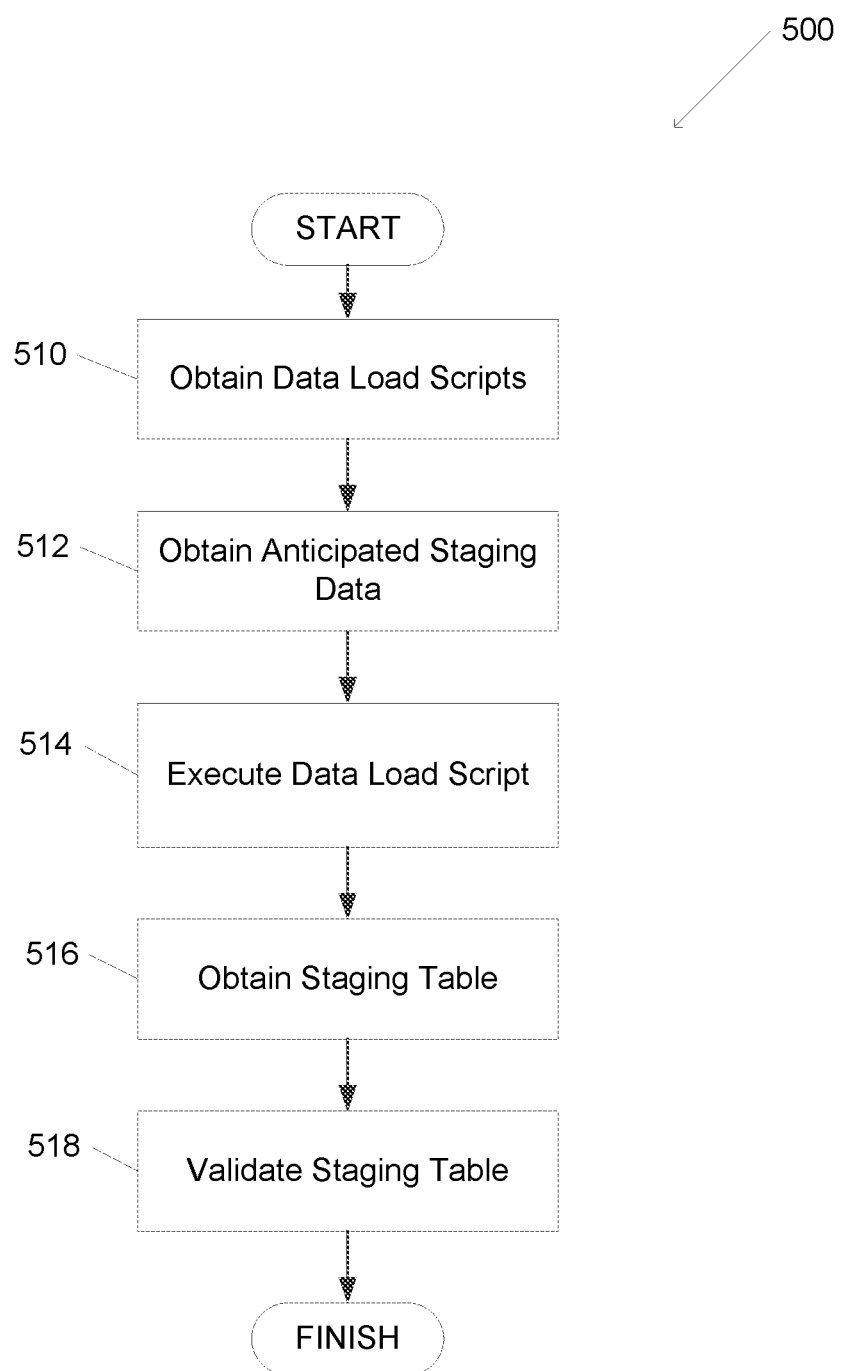
FIG. 5 depicts a flow chart for automated testing of staging data according to one or more aspects of the disclosure.

Staging data can be automatically tested to ensure that the staging tables are properly generated, contain the appropriate dimensions, and have values within expected ranges. FIG. 5 depicts a flow chart for automated testing of staging data according to one or more aspects of the disclosure. Some or all of the steps of process 500 can be performed using one or more computing devices as described herein. Process 500 can include obtaining (510) data load scripts. The data load scripts can be obtained from a control processing device and/or automatically generated based on human-readable configuration files as described herein.

Anticipated staging data can be obtained (512). The anticipated staging data can include a set of dimensions and a set of associated values for each of the dimensions. In a variety of embodiments, the anticipated staging data can include relationships between the dimensions and/or values. The anticipated staging data can be provided as database table(s), flat files, a set of comma-separated values, and/or any other representation as appropriate to particular aspects of the invention. The anticipated staging data can be defined using a set of rule-based checks and/or automatically generated using one or more machine classifiers as described herein.

Data load scripts can be executed (514) and staging tables can be obtained (516). The data load scripts can be executed by a database system. The data load scripts, when executed, can cause one or more staging tables to be generated. The staging tables can include a set of dimensions and a set of associated values for each of the dimensions. Processes for generating staging tables are described in more detail with respect to FIG. 7.

Staging tables can be validated (518). Staging tables can be validated to ensure that the staging tables have the expected dimensions. For example, a set of dimensions defined in the anticipated staging data can be compared to the dimensions of the staging table. If any anticipated dimensions are missing and/or additional dimensions were generated, the staging table can be flagged as invalid data. Staging tables can be validated to ensure that the values stored in the staging table correspond to the anticipated values. In a number of embodiments, staging tables can be validated to determine the number of records (e.g. rows of values) is within a threshold number of records, determine if values are missing for one or more dimensions, determine that some or all of the values are within a particular range of values, determine the minimum and/or maximum values for one or more dimensions, determine changes from historical average values anticipated for one or more dimensions, and the like. In many embodiments, the staging tables can be validated using one or more machine classifiers. Machine classifiers can automatically compare the staging tables to the anticipated staging data along with calculating a probabilistic likelihood that the dimensions and/or values of the staging tables correspond to the anticipated staging data. The machine classifier can be trained using any of a variety of data as described herein. If some or all of the staging table data falls outside of the anticipated staging data, the staging table and/or the subset of the staging table that fails to validate can be flagged as invalid data. For example, if the probabilistic threshold generated by a machine classifier falls under a threshold value, the staging table can be flagged as invalid. Notifications indicating the invalid data can be automatically generated and provided for further processing as described herein.

Automatically Testing Control Scripts

Figure 6:
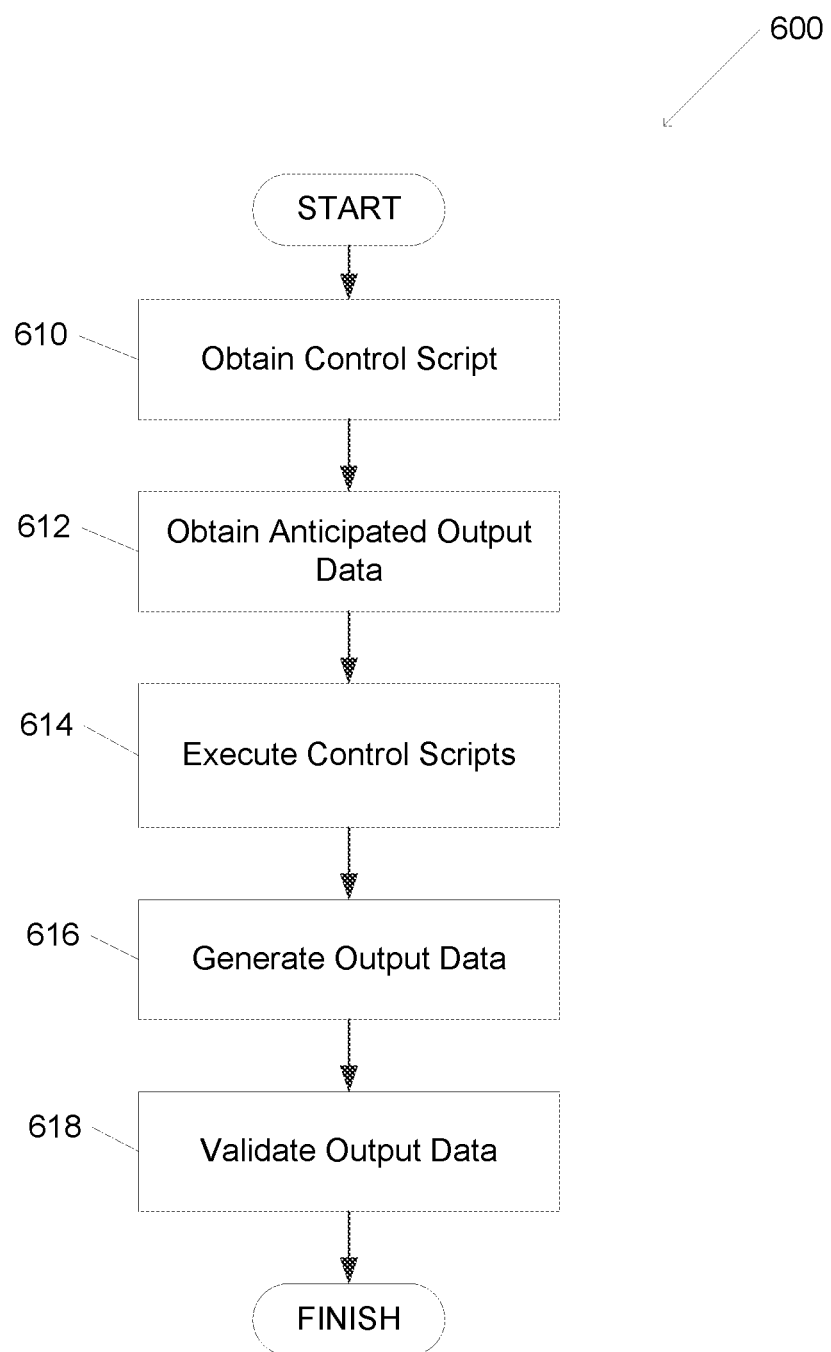
FIG. 6 depicts a flow chart for automated testing of controls according to one or more aspects of the disclosure.

Control scripts can be automatically tested and/or validated to ensure that the control script will both execute without errors and generate valid output data for further processing. FIG. 6 depicts a flow chart for automated testing of control scripts according to one or more aspects of the disclosure. Some or all of the steps of process 600 can be performed using one or more computing devices as described herein. Process 600 can include obtaining (610) control scripts. The data load scripts can be obtained from a control processing device and/or automatically generated based on human-readable configuration files as described herein.

Anticipated output data can be obtained (612). The anticipated output data can include a set of expected output values calculated and/or identified based on the tasks defined in the control scripts. The anticipated output data can be provided as database table(s), flat files, a set of comma-separated values, and/or any other representation as appropriate to particular aspects of the invention. The anticipated output data can be defined using a set of rule-based checks and/or automatically generated using one or more machine classifiers as described herein.

Control scripts can be executed (614) and output data can be obtained (616). The control scripts can be executed to obtain data from one or more staging tables, perform a variety of tasks based on the obtained data, and generate a set of output data based on the performed tasks. The output data can include any data defined by the tasks, such as indications of rows of data within the staging table(s) that violate one or more business rules.

Output data can be validated (618). Output data can be validated to ensure that the output data properly identifies particular anomalies within the data stored in the staging tables. For example, a set of expected output values in the anticipated output data can be compared to the actual output data obtained. If the output data includes data that does not match the anticipated output data for the particular task(s) corresponding to the data, that data and/or the output data in its entirety can be flagged as invalid data. Output data can be validated to determine that some or all of the values in the output data are within a particular range of values, determine the minimum and/or maximum values for one or more pieces of output data, determine changes from historical average values anticipated for the output data, and the like. In many embodiments, the output data can be validated using one or more machine classifiers. Machine classifiers can automatically compare the output data to the anticipated output data along with calculating a probabilistic likelihood that the output data corresponds to the anticipated output data. The machine classifier can be trained using any of a variety of data as described herein. If some or all of the output data falls outside of the anticipated output data, the output data and/or an appropriate subset of the output data that fails to validate can be flagged as invalid data. For example, if the probabilistic threshold generated by a machine classifier falls under a threshold value, the output data can be flagged as invalid. Notifications indicating the invalid data can be automatically generated and provided for further processing as described herein.

Generating Staging Tables

Figure 7:
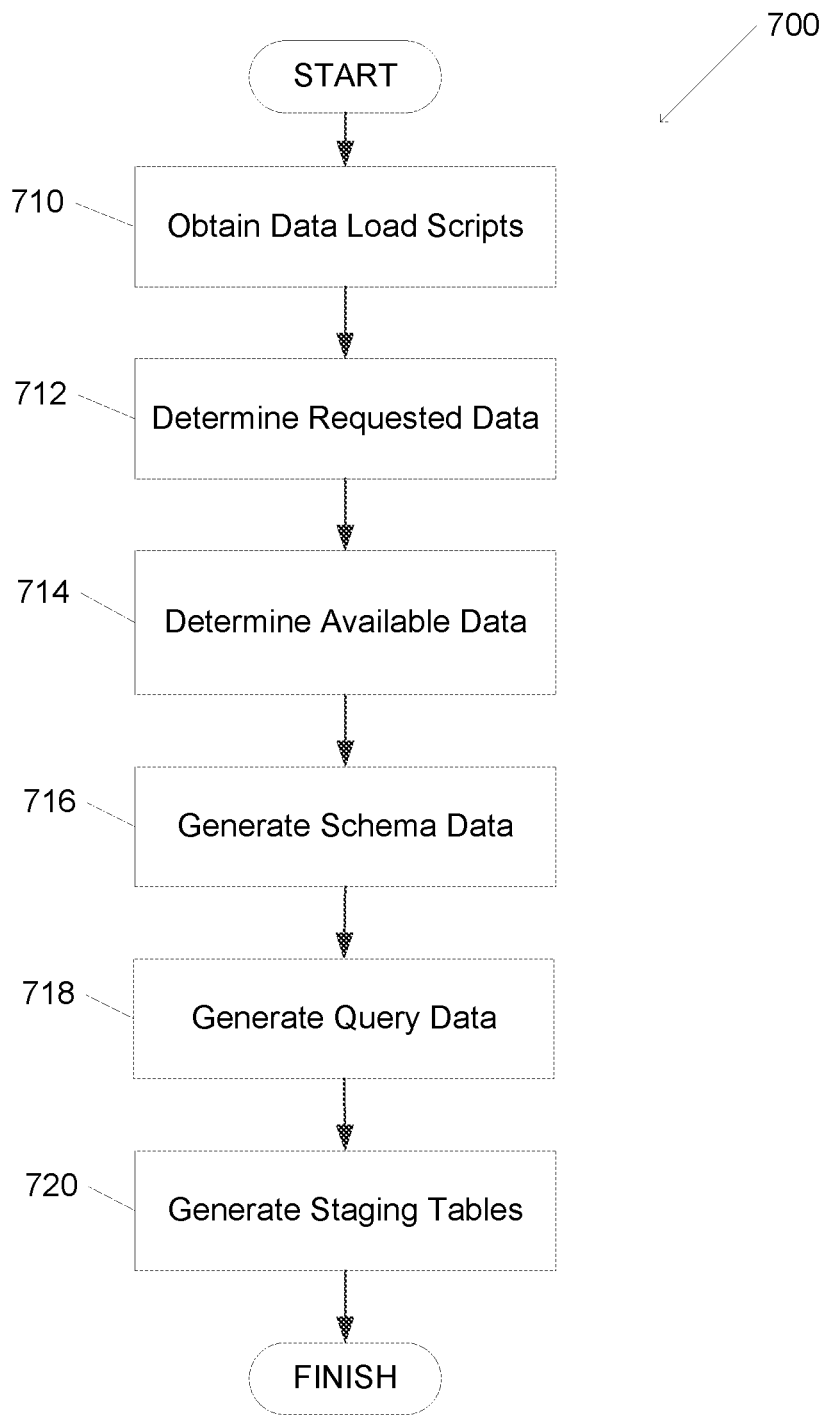
FIG. 7 depicts a flow chart for preparing staging tables according to one or more aspects of the disclosure.

Staging tables can be automatically generated in order to store a subset of raw data and/or provide transformations and/or aggregations of the raw data for analysis by one or more control scripts. FIG. 7 depicts a flow chart for preparing staging tables according to one or more aspects of the disclosure. Some or all of the steps of process 700 can be performed using one or more computing devices as described herein. Process 700 can include obtaining (710) data load scripts. The data load scripts can be obtained from a control processing device and/or automatically generated based on human-readable configuration files as described herein.

Requested data can be determined (712). The requested data can indicate one or more dimensions as specified in the data load scripts. In a variety of embodiments, multiple data load scripts can be analyzed to determine a superset of dimensions that can be utilized across multiple data load scripts and/or control scripts. The combination of dimensions across multiple scripts can reduce redundancies in the generated staging tables and/or allow for additional insights into the underlying raw data as compared to having individual staging tables for each data load script.

Available data can be determined (714). In a number of embodiments, one or more staging tables are maintained and the obtained data load scripts can be used to modify the existing staging tables. In many embodiments, staging tables are defined for particular logical entities and updated when a data load script associated with the logical entity is obtained. For example, logical entities can include accounts, transactions, fulfillment pieces, credit limit increase requests, digital interactions, and the like. Logical entities can be utilized across multiple lines of business. The existing staging tables can include a variety of dimensions defining the data currently available from the existing staging tables.

Schema data can be generated (716). The schema data can define the structure of one or more staging tables. The structure of a staging table can include a set of dimensions and/or a set of relationships between the dimensions and/or or other staging tables. In a variety of embodiments, a schema can defines the tables, dimensions, relationships, views, indexes, packages, procedures, functions, queues, triggers, types, sequences, materialized views, XML schemas, and any other elements. In many embodiments, schema data is formatted using SQL; however, any format can be utilized as appropriate. The schema data can be generated based on the dimensions available in the source databases and/or dimensions that need to be synthesized from one or more dimensions in the source databases. In this way, the database schema can define one or more staging tables having dimensions that satisfy the dimensions indicated in the requested data, where the dimensions in the staging tables are based on the dimensions indicated in the available data.

Query data can be generated (718). The query data can include machine-executable instructions to obtain data from a database corresponding to the identified dimensions. For example, the query data can be executed by a database system to obtain raw data, process the raw data according to one or more transformations and/or aggregations, and store the processed data using a staging table. The query data can include machine-executable instructions to modify a database schema for one or more staging tables. The database schema can indicate a set of dimensions, data types for each of the dimensions, and/or relationships between the dimensions and/or staging tables. For example, the query data can be executed by a database system to add a new dimension to an existing staging table.

Staging tables can be generated (720). In many embodiments, staging tables can be generated by executing query data using a database system to obtain and process raw data stored using the database system as described herein. The staging table can be created to have a structure defined by the schema data. The staging table can store the data defined by the query generated for all the data load scripts and/or control scripts as described herein. The staging tables can be automatically generated when new data is requested, the schema data is updated, and/or updated automatically based on a schedule. For example, the staging tables can automatically update every twenty-four hours. In another example, the staging tables can be automatically updated when a new dimension is added to the schema defining the particular staging table.

One or more aspects discussed herein can be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules can be written in a source code programming language that is subsequently compiled for execution, or can be written in a scripting language such as (but not limited to) HTML or XML. The computer executable instructions can be stored on a computer readable medium such as a hard disk, optical disk, removable storage media, solid-state memory, RAM, and the like. As will be appreciated by one of skill in the art, the functionality of the program modules can be combined or distributed as desired in various embodiments. In addition, the functionality can be embodied in whole or in part in firmware or hardware equivalents such as integrated circuits, field programmable gate arrays (FPGA), and the like. Particular data structures can be used to more effectively implement one or more aspects discussed herein, and such data structures are contemplated within the scope of computer executable instructions and computer-usable data described herein. Various aspects discussed herein can be embodied as a method, a computing device, a control processing system, and/or a computer program product.

Although the present invention has been described in certain specific aspects, many additional modifications and variations would be apparent to those skilled in the art. In particular, any of the various processes described above can be performed in alternative sequences and/or in parallel (on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
obtaining, by a computing device comprising a memory and a processor in communication with the memory, a database schema;
obtaining, by the computing device, a human-readable configuration file comprising instructions written in a human-readable format;
generating, by the computing device, a data load script comprising a set of machine-executable instructions based on the human-readable configuration file;
validating, by the computing device, the data load script based on the database schema;
generating, by the computing device, a staging table schema based on the validated data load script;
generating, by the computing device, an empty staging table based on the staging table schema;
populating, by the computing device and to generate a populated staging table, the generated empty staging table with a set of staging table data by executing the validated data load script to obtain the set of staging table data from a database system;
obtaining, by the computing device, a control script indicating the populated staging table;
validating, by the computing device, the control script indicating the populated staging table, the populated staging table having been populated by the execution of the validated data load script; and
generating, based on a validation of the control script and by the computing device, a set of output data, based on the populated staging table, by executing the validated control script.

2. The method of claim 1, wherein:
the set of machine-executable instructions comprise at least one query formatted using a structured query language; and
the at least one query causes the computing device to perform one or more transformations on a set of raw data.

3. The method of claim 1, further comprising:
obtaining, by the computing device, a set of test data; and
validating, by the computing device, the set of output data based on the set of test data.

4. The method of claim 1, further comprising:
obtaining, by the computing device, a set of test data, wherein validating the control script is based on the set of test data.

5. The method of claim 1, further comprising:
generating, by the computing device, the empty staging table based on a pre-determined schedule; and
validating, by the computing device, the populated staging table to identify invalid data in the populated staging table based on a set of data validity rules.

6. The method of claim 1, further comprising generating, by the computing device, the staging table schema by identifying a set of dimensions identified in the human-readable configuration file.

7. The method of claim 1, further comprising:
validating, by the computing device, the set of output data;
identifying, by the computing device, a set of invalid data in the set of output data;
generating, by the computing device, a notification comprising the set of invalid data; and
transmitting, by the computing device, the notification.

8. The method of claim 1, further comprising:
obtaining, by the computing device, a set of test data comprising a set of expected output values; and
identifying, by the computing device, a set of invalid data by comparing the set of expected output values to the set of output data, wherein a piece of invalid data comprises a piece of output data exceeding a threshold difference of a corresponding expected output value in the set of expected output values.

9. The method of claim 8, wherein the set of test data is generated using a machine learning classifier.

10. The method of claim 1, wherein the validation of the control script uses a machine learning classifier and is based on the set of output data,
wherein the validation of the control script comprises an indication of a historical control and a probabilistic likelihood that the historical control corresponds to the control script; and
wherein the machine learning classifier is trained using a set of historical controls and a set of historical output data.

11. A system, comprising:
a database storing a set of raw data and a database schema;
one or more processors; and
memory storing instructions that, when executed by the one or more processors, cause the system to:
obtain, by the one or more processors, a human-readable configuration file comprising instructions written in a human-readable format;
generate, by the one or more processors, a data load script comprising a set of machine-executable instructions based on the human-readable configuration file;

validate, by the one or more processors, the data load script based on the database schema;

generate, by the one or more processors, a staging table schema based on the validated data load script;

generate, by the one or more processors, an empty staging table based on the staging table schema;

populate, by the one or more processors and to generate a populated staging table, the generated empty staging table with a set of staging table data by executing the validated data load script to obtain the set of staging table data from a database system;

obtain, by the one or more processors, a control script indicating the populated staging table;

validate, by the one or more processors, the control script indicating the populated staging table, the populated staging table having been populated by the execution of the validated data load script; and generate, based on a validation of the control script and by the one or more processors, a set of output data, based on the populated staging table, by executing the validated control script.

12. The system of claim 11,
wherein the set of machine-executable instructions comprise at least one query formatted using a structured query language, and
wherein the at least one query causes the computing device to perform one or more transformations on a set of raw data.

13. The system of claim 11, wherein the instructions, when executed by the one or more processors, further cause the system to:
obtain, by the computing device, a set of test data; and
validate, by the computing device, the set of output data based on the set of test data.

14. The system of claim 11, wherein the instructions, when executed by the one or more processors, further cause the system to:
determine an expected range of values based on the set of raw data and the validated data load script,
wherein the validation of the data load script is based on the expected range of values.

15. The system of claim 11, wherein the instructions, when executed by the one or more processors, further cause the system to:
obtain test data corresponding to the control script,
wherein the validation of the control script is based on the test data.

16. The system of claim 11,
wherein the control script comprises a human-readable configuration file; and
wherein the instructions, when executed by the one or more processors, further cause the system to execute the validated control script to:
generate an executable control script based on the human-readable configuration file; and
generate the set of output data by executing the executable control script.

17. The system of claim 11, wherein the instructions, when executed by the one or more processors, further cause the system to:
generate the empty staging table based on a pre-determined schedule;

populate the empty staging table to generate a populated staging table; and
validate the populated staging table to identify invalid data, in the populated staging table, based on a set of data validity rules.

18. A non-transitory machine-readable medium storing instructions that, when executed by one or more processors, cause the one or more processors to perform steps comprising:
obtaining, by a computing device comprising a memory and a processor in communication with the memory, a human-readable configuration file comprising instructions written in a human-readable format;
generating, by the computing device, a data load script comprising a set of machine-executable instructions based on the human-readable configuration file;
validating, by the computing device, the data load script based on the database schema;
generating, by the computing device, a staging table schema based on the validated data load script;
generating, by the computing device, an empty staging table based on the staging table schema;
populating, by the computing device and to generate a populated staging table, the generated empty staging table with a set of staging table data by executing the validated data load script to obtain the set of staging table data from a database system;
obtaining, by the computing device, a control script indicating the populated staging table;
validating, by the computing device, the control script indicating the populated staging table, the populated staging table having been populated by the execution of the validated data load script; and
generating, based on a validation of the control script and by the computing device, a set of output data, based on the populated staging table, by executing the control script.

19. The non-transitory machine-readable medium of claim 18,
wherein the validated data load script comprises a human-readable configuration file; and
wherein the instructions further cause the one or more processors to generate the empty staging table by:
generating the staging table schema based on the human-readable configuration file;
generating a database query based on the human-readable configuration file; and
populating, to generate a populated staging table, the empty staging table by executing the database query, using the database, to obtain a set of data corresponding to the staging table schema.

20. The non-transitory machine-readable medium of claim 18,
wherein the validated control script comprises a human-readable configuration file, and
wherein the instructions further cause the one or more processors to execute the validated control script by:
generating an executable control script based on the human-readable configuration file; and
generating the set of output data by executing the executable control script.

* * * * *